ISAAC B. WIGGIN, OF WASHINGTON, DISTRICT OF COLUMBIA.

Letters Patent No. 63,777, dated April 9, 1867.

IMPROVED BURNING-FLUID.

The Schedule referred to in these Letters Patent and making part of the same.

*To all whom it may concern:*

Be it known that I, ISAAC B. WIGGIN, of the city of Washington, and District of Columbia, have invented a new and improved Chemical Burning-Fluid, for burning in all kinds of lamps with perfect safety; and I do hereby declare that the following is a full and exact description thereof, as the specimens will show, and may be mixed and tested.

It is well known that when benzine or naphtha (the light products produced from the distillation of petroleum) is mixed with other hydrocarbons in definite proportions a burning-fluid of variable density is produced, and that the brilliancy of the flame of this fluid depends upon a proper union of two essential elements, hydrogen and carbon. To fix the density of a compound composed of a variety of hydrocarbons seems to be an essential feature had in view by all manufacturers of burning-fluids. I am aware that common salt, carbonates of soda, acetate of lead, tartaric acid, borax, onions, potatoes, &c., &c., have been used by manufacturers, to harden the fluid, as they term it, and cause a given quantity of the fluid to burn a longer time. The point to be gained, therefore, in a mixture of these hydrocarbons, is to unite with them certain chemical agents in order to increase the specific gravity of the compound, and thus render it less liable to volatilization and explosion.

The well-known incompatibility of the agents above named when thrown together promiscuously is apparent, and the most that could be expected would be the formation of a new chemical compound, wholly diverse from that intended by the manipulator. To gain this point desired for these hydrocarbons when mixed together, I use the triple phosphates of soda, ammonia, and water, commercially termed microcosmic salt. This salt, from its chemical constitution, seems to be better adapted for this use than any other chemical agent that can be named.

First, it is readily soluble in hydrocarbons. This property it owes to the fact that the equivalent in the water of crystallization are about one-third of that of other agents now used, and less than one-third of the monobasic phosphates.

Secondly, this salt is composed of chemical agents in harmonious union or compatibility with each other.

Thirdly, when dissolved and thoroughly blended in a mixture of hydrocarbons the density of the compound must necessarily be increased, thus rendering the compound less volatile, not liable to explosion, and making an otherwise dangerous compound perfectly safe and harmless.

Naphtha itself being of a light nature, care must be taken in mixing other hydrocarbons with it to select those of the greatest density. For this purpose, in addition to turpentine, whose formula is $H^5 C^4$, I employ the oil of lemons in preference to any other of the essential oils, its formula being the same as that of turpentine.

To enable others skilled in the art to make and use my invention, I will proceed to describe the ingredients of which this mixture is composed.

Forty gallons naphtha, two gallons kerosene-oil, one pound gum-camphor, one pound gum-turpentine, one ounce oil lemons, one ounce oil cloves, four ounces microcosmic salt.

What I claim as my invention, and desire to secure by Letters Patent, is—

The incorporation of microcosmic salt with the above-named compound of hydrocarbons, reference being had to the use of denser materials both in the composition of the hydrocarbons and the microcosmic salt, so as to make a fluid that can be burned in any kind of lamp without smoke, bad odor, or danger from explosion.

ISAAC B. WIGGIN.

Witnesses:
CLINTON ANDERSON,
WM. H. NEWTON.